May 14, 1946.    M. M. PERKINS ET AL    2,400,437
HYDROCARBON CONVERSION
Filed Nov. 15, 1943

INVENTORS
MYRLE M. PERKINS
BERNARDUS SELLMEYER
BY
E. F. Liebrecht
G. H. Palmer
ATTORNEYS Patented May 14, 1946

2,400,437

UNITED STATES PATENT OFFICE 2,400,437

HYDROCARBON CONVERSION

Myrle M. Perkins, Plandome, N. Y., and Bernardus Sellmeyer, Los Angeles, Calif., assignors to The M. W. Kellogg Company, Jersey City, N. J., a corporation of Delaware Application November 15, 1943, Serial No. 510,436

3 Claims. (Cl. 260—671)

This invention relates to an improved process for effecting alkylation of unsaturated carbocyclic compounds. More particularly the invention relates to an improved process for alkylating aromatic hydrocarbons of higher molecular weight. Still more particularly the invention relates to an improved process for effecting alkylation of benzene with propene to produce isopropyl benzene, or cumene.

The compounds which may be subjected to alkylation with olefins in the improved process comprise unsaturated carbocyclic organic compounds, including unsaturated cyclic hydrocarbons, such as aromatic or cyclo-olefin hydrocarbons, and unsaturated carbocyclic non-hydrocarbon compounds, such as phenol.

The process involves the use of any suitable olefin in the improved process but those of relatively low molecular weight having two to six carbon atoms per molecule, such as normally gaseous olefins, ordinarily are preferred.

The invention will be described below in more detail by reference to a specific example of the invention involving the reaction of benzene with propene to produce isopropyl benzene, or cumene. It is to be understood, however, that the improved process of the invention includes within its scope of application the treatment of various compounds included within the above definition. Aside from the alkylation of benzene with an olefin the invention has other important applications in the alkylation of other aromatic hydrocarbons with olefins. The general method of operation of the process is the same, however, for all such compounds as will be apparent from the following detailed description.

The invention will be described in detail by reference to the accompanying drawing which is a diagrammatic view in elevation of an arrangement of apparatus suitable for carrying out the improved process. Referring to the drawing, the reaction of benzene and propene is carried out in a reaction zone comprising a series of reactors 1, 2, 3, 4 and 5. These reactors are connected by suitable pipe lines for flow of the reactants through the reactors in series starting with any desired reactor as the first in series with provision for by-passing one or more of the reactors. Each of reactors 1, 2, 3, 4 and 5 is connected by lines 6, 7, 8, 9 and 10 respectively to the next reactor in the series, the connecting lines extending from the bottom of the leading reactor to the top of the following reactor. This arrangement provides for a downflow of reactants in the reactor, which is the operation ordinarily preferred. However, upflow of the reactants in the reactors also is within the scope of the invention. Each of reactors 1, 2, 3, 4 and 5 contains a granular mass of polymerizing catalyst which may be supported within the reactors on suitable trays or baskets, etc.

In the modification of the invention illustrated in the drawing provision is made for passing the reaction mixture through two or more of the reactors in series while by-passing any one of the reactors during the period in which its catalyst content is undergoing replacement or regeneration. The reactors 1, 2, 3, 4 and 5 are best utilized in an operation in which four of the reactors are in use continuously and the remaining reactor is excluded from the stream of reactants while the catalyst therein is being replaced or regenerated. Thereafter the first reactor in the series through which the reaction mixture is passed is removed from the path of flow of the reactants and is replaced by the insertion of a reactor containing fresh or regenerated catalyst at the end of the series as the last reactor through which the reaction mixture passes. In this method of operation the reaction mixture passes first through the reactor containing the least active catalyst in the reaction zone and passes last through the reactor containing the most active catalyst in the reaction zone.

The fresh feed containing propene is introduced into the system through line 11 which is provided with a pump 12 and connects with the entrance of heating coil 13 located in heater 14. The material introduced into the system through line 11 may consist substantially entirely of propene, or other suitable olefin reactant, but ordinarily comprises, in addition to the propene, substantial proportions of relatively inert hydrocarbons, such as propane and butanes. The effect of such accompanying paraffin hydrocarbons appears to be merely one of dilution so that any proportion of such inert materials which does not substantially reduce the effective capacity of the apparatus may be tolerated. Generally the presence of a large proportion of inert materials in the reaction zone requires a higher operating pressure. The propene fresh feed is obtained ordinarily from gases, produced by cracking of hydrocarbon oils, which may be relatively low in olefins. It is unnecessary to effect any preliminary fractionation of the gases except for the purpose of separating excessive quantities of inert gases, such as paraffins, and separating unsaturated hydrocarbons which would cause reactions undesired in the process.

While the process may be operated on an olefin feed containing a plurality of different olefin reactants it is desirable ordinarily to employ an olefin gas containing only a single olefin, or at least all olefins of the same number of carbon atoms per molecule in order to produce the desired alkylated products.

The benzene, or other suitable aromatic hydrocarbon, is introduced into the system through line 15 which is provided with a pump 16 and connects with line 11 near the entrance of pipe coil 13. This material consists of benzene as such or is a narrow boiling fraction containing substantially no hydrocarbons other than benzene and paraffin and cycloparaffin hydrocarbons. The hydrocarbon mixture introduced into pipe coil 13 from line 11 is heated to a temperature effective to initiate the reaction of propene with benzene. The temperature to which the hydrocarbon reactants are heated in pipe coil 13 is sufficiently high to produce in the reaction zone a temperature in the range of 300 to 500° F.

The reaction mixture may be heated to the temperature desired at the entrance of the first reactor by passing the mixture as such through heated coil 13 or either of the component streams of benzene and propene feed may be heated separately to a higher temperature and then mixed in the desired proportion with the other, cool, stream to form a mixture having the desired temperature.

The hot reactor charge passes from pipe coil 13 into line 17 through which the charge is passed to the entrance of the first reactor in the series. Line 17 is connected to lines 6, 7, 8, 9 and 10 at points adjacent the junction of these lines with the top of a reactor by means of lines 18, 19, 20, 21 and 22 respectively. Lines 6, 7, 8, 9 and 10 are also connected, by means of lines 23, 24, 25, 26 and 27 respectively, with line 28 which connects in turn with fractionator 29 which serves as a depropanizer for the reaction product. Line 28 passes through cooling means 30 to effect preliminary cooling of the reaction product.

In depropanizer 29 fractionating conditions of temperature and pressure are maintained effective to separate overhead hydrocarbons which are lower boiling than benzene. These consist ordinarily of the inert hydrocarbons accompanying propene in the propene feed and a very small amount of propene which is unreacted in the process. These gases pass overhead from tower 29 through line 31 which connects with reflux drum 32, with cooling means at 33. At 33 the gases are cooled sufficiently to effect a liquefaction of a substantial proportion thereof. Separation of gases so liquefied occurs in drum 32, with uncondensed gases being withdrawn through line 34. The condensate collected in drum 32 is withdrawn through line 35 provided with pump 36. A portion, or all, of the condensate flowing through line 35 may be diverted through line 37 and returned to the top of tower 29 as reflux.

The depropanized liquids which collect in the bottom of tower 29 consist ordinarily of benzene, the alkylated benzene product and any inert hydrocarbons in the boiling range of these hydrocarbons which are introduced into the system with the fresh feed. Ordinarily, however, the proportion of such inert hydrocarbons in this fraction is relatively small. The liquid condensate is transferred from the bottom of depropanizer 29 to debenzenizer 38 by means of line 39.

In tower 38 conditions of temperature and pressure are maintained which are effective to separate benzene as an overhead product from a bottoms condensate containing the alkylated benzene product. This product consists essentially of isopropyl benzene, or cumene, but may include small proportions of more highly alkylated benzenes. The condensate collected in the bottom of tower 38 is withdrawn through line 40 provided with pump 41. This liquid mixture ordinarily is transferred to further fractionating apparatus, not shown, for separation of a product concentrated in cumene.

The benzene vapors separated overhead in tower 38 are withdrawn through line 42 which is provided with cooling means 43 and connects with reflux drum 44. At 43 complete condensation of the benzene vapors is effected. The condensate is collected in drum 44 from which it is withdrawn through line 45 which is provided with pump 46. A portion of the benzene condensate may be diverted from line 45 and returned to the top of tower 38 as reflux, through line 47.

If the benzene feed has an excessive water content it can be reduced by introducing at least a part of this feed directly into tower 29 by a suitable connection with the outlet of pump 16. Water is distilled overhead in tower 29 and recovered as a separate phase.

As the hydrocarbon mixture passes through the reaction zone the exothermic reaction of benzene with propene results in the development of heat in the reaction zone. Since it is desired to maintain the reactants at the temperature level which is most efficient for the formation of the desired alkylated product it is necessary to provide means for counteracting the temperature rise which would otherwise take place in the reaction zone. In connection with this invention it is found that control of the reaction temperature may be achieved by direct introduction into the reaction zone, at one or more intermediate points along the path of flow of the reaction mixture through the reaction zone, of cool liquefied portions of either or both of the components of the fresh feed. These are heated by the reactants so that their presence results in the abstraction of heat from the reaction mixture. By controlling the quantity of such cooling media introduced at each interval along the length of the reaction zone in accordance with the amount necessary to maintain the reaction temperature at that point the reaction zone may be maintained throughout its length at the desired reaction temperature.

This method of operation is particularly advantageous in controlling the temperature in a reaction zone which is in the form of a plurality of reactors through which the reaction mixture passes in series and which are operated in the manner described above. In this method of operation the zone of maximum reaction passes gradually along the length of the first reactor in the series and from one reactor to the next. Consequently the amount of heat which it is necessary to abstract from any one point in the reaction zone varies with the age of the catalyst at that point and the proportion of reactive ingredients in the mixture passing through the zone at that point. It is advantageous, therefore, to provide in accordance with this invention means for introducing cooling fluid independently at each of a plurality of points along the length of the reaction zone.

In accordance with this invention the cooling fluids are introduced directly into the reactors, and into the path of flow of the reaction mixture, at a plurality of independently controlled points along the length of the reaction zone. When the granular catalytic material is disposed within the reactors on a plurality of trays, or baskets, injection of cooling fluid may be effected advantageously at points below each tray or basket. The cooling fluid may consist entirely of the propene feed or it may consist entirely of the recycled benzene fraction or it may comprise a mixture of these fluids.

Preferably, however, temperature control in the first part of the reaction zone, in which reaction is most intense, is effected by means of the introduction of cool propene feed while temperature control in the latter part of the reaction zone, where the reaction is less intense, may be effected by the introduction of cool liquefied benzene fraction. This combination of temperature control operations is advantageous for the reason that it serves to maintain the concentration of propene in the first part of the reaction zone at the desired level whereby the production of alkylated products is promoted and for the reason that it effects control of the reaction temperature in the latter part of the reaction zone without the introduction of further amounts of propene which might pass out of the reaction zone without being reacted to a sufficient degree. At the same time the use of the benzene fraction as a temperature control medium in the latter stages of the reaction zone promotes the formation of cumene by increasing the ratio of benzene to propene and also permits the application of higher temperatures, if desired, to effect maximum clean-up of propene.

Line 45 is connected by means of branch lines 48, 49, 50, 51 and 52 with reactors 1, 2, 3, 4 and 5, respectively. Each of these branch lines connects with the corresponding reactor at a plurality of intermediate points as shown in the drawing. Each branch line, in its connections with a reactor, is provided with valve means for regulating the flow of liquids into the reactors at each point of connection. Line 45 and the various lines connecting it with intermediate points in the reactors are provided for introducing cool liquid benzene into the reactors at such intermediate points for purposes of temperature control.

Line 45 is connected also with line 15 by means of line 53 as shown, to effect, in the normal operation of the process, recycling of benzene to the entrance of the reaction zone. However, while the normal use of line 53 involves flow of benzene from line 45 to line 15, as indicated by the directional arrow, line 53 may be used also for transferring cool benzene directly from line 15 into the reactors at intermediate points thereof.

Lines 48, 49, 50, 51 and 52 also are connected by lines 54, 55, 56, 57 and 58 respectively with line 59 which connects in turn with line 11 at a point between pump 12 and the junction of line 11 with line 15. This arrangement provides for the introduction of cool propene feed directly into the reactors at intermediate points thereof. By means of the valves in lines 48, 49, 50, 51, 52, 54, 55, 56, 57 and 58 the interior of any one of the reactors may be controlled as to temperature by the introduction therein of either cool propene feed or cool benzene. It is a preferred modification of the improved process to effect temperature control in the reactors through which the reaction mixture passes first by the introduction therein at intermediate points of cool propene feed while effecting temperature control of the latter reactors in the series by the introduction of cool recycled benzene at intermediate points. For example assuming four of the reactors are in use it is a preferred modification to introduce cool propene feed into the first two reactors in the series as the temperature control medium while introducing cool recycled benzene into the last two reactors in the series for that purpose.

For purposes of illustration, reference is made to a condition of operation of the system in which the reactors are flowed successfully through reactors 4, 5, 1 and 2 in that order, reactor 3 being by-passed to remove it from the system during replacement of the catalyst. The propene feed and benzene are mixed at the junction of line 15 with line 11 in a mol ratio of benzene to propene substantially greater than 1:1. This ratio should be as high as is economical or practicable to promote the formation of cumene and minimize the formation of more highly alkylated benzenes and condensation products of propene. For example a mol ratio of benzene to propene at that point of 5:1 or higher has been found to be effective in promoting the desired reaction.

The reaction mixture passing through line 17, which has been heated in coil 13 to a temperature of, for example, 400° F., passes from line 17 into line 20 which connects in turn with line 8 whereby the reaction mixture is passed into the top of reactor 4. In this operation the valves in lines 22, 18, 19 and 21 are closed while the valve in line 20 is opened. The reaction mixture passes from the bottom of reactor 4 through line 9 to the top of reactor 5, the valve in line 9 being open while the valve in line 26 is closed. The reaction mixture emerges from reactor 5 through line 10 through which the mixture passes to the top of reactor 1, the valve in line 10 being open, while that in line 27 is closed. The reaction mixture passes downwardly through reactor 1 and emerges at the bottom thereof through line 6, by which the mixture is transferred to the top of reactor 2, the valve in line 6 being open while that in line 23 is closed. The reaction mixture emerges from the bottom of reactor 2 through line 7. The valve in line 7 is closed while that in line 24 is open whereby the reaction mixture emerging from reactor 2 passes directly into line 28 through which it passes to fractionator 29 in the manner described above.

In the operation just described the reaction mixture contacts in reactor 4 the catalyst mass which has been in use longest of all the catalyst in the reaction zone and then in turn passes over the next oldest catalyst mass in reactor 5. While the catalyst mass in reactor 4 is less active than the catalyst contained in reactors 5, 1 and 2 the reaction mixture passing through reactor 4 is more concentrated in reactive ingredients than in subsequent stages of the passage of the mixture through the reaction zone. Consequently the alkylation reaction and the evolution of heat are more intense in reactors 4 and 5 than in reactors 1 and 2.

In accordance with the preferred modification of the process the temperature in reactors 4 and 5 is controlled by the introduction therein, at spaced intervals, of cool propene feed. Consequently in this operation the valves in lines 51 and 52 are closed while those in lines 57 and 58 are open. Cool propene feed thus flows from line 59 into lines 51 and 52 and, through the various branches of these lines, into reactors 4 and 5 at spaced intervals along the lengths thereof. By means of the valves provided at each connection along the length of reactors 4 and 5 a regulated quantity of cooling fluid is introduced at each point to provide the necessary temperature control at that point and to maintain the reaction temperature at the desired level.

At the same time the degree of reaction and the evolution of heat in reactors 1 and 2 is less than in reactors 4 and 5, in spite of the relative freshness of the catalyst in reactors 1 and 2, because of the relative leanness of the reaction mixture in reactive ingredients. The function of reactors 1 and 2 is primarily to effect substantially complete conversion of propene by reaction thereof with benzene whereby the reaction product introduced into depropanizer 29 contains as small an amount of propene as is practicable. In reactors 1 and 2 temperature control is effected preferably by the introduction of recycled benzene. Consequently the valves in lines 48 and 49 are open while those in lines 54 and 55 are closed. In this manner recycled benzene flows from line 45 into lines 48 and 49 and, through the various branches thereof, into reactors 1 and 2 at spaced intervals along the lengths thereof. By means of the valves in the various connections along the lengths of reactors 1 and 2 regulated quantities of benzene are introduced at each point as required to maintain the temperature at each point at the desired level. During this operation the valves in lines 50 and 56 are, of course, closed.

In the above operation the division between the point, along the length of path of flow of reactants through the reaction zone, at which the introduction of cool propene feed is discontinued and the introduction of recycled benzene is instituted is between reactors whereby no reactor receives both propene feed and benzene as cooling fluid. As this is a convenient method for dividing the zones in which these cooling fluids are used the apparatus illustrated does not provide means for introducing propene feed at one point in a reactor while introducing benzene at another point in the same reactor. It is to be understood, however, that the point of the division of the reaction zone into the parts thereof which are controlled in temperature by the introduction of propene feed or benzene is not necessarily between reactors. It is within the scope of the invention to provide means for introducing either benzene or propene feed at each connection along the length of the reactor regardless of the type of cooling medium being introduced at other points in that reactor.

In this specific operation the propene introduced as cooling fluid in reactors 1 and 2 passes through at least two complete reactors whereby opportunity is provided for substantially complete reaction of propene thus introduced. The introduction of benzene into reactors 1 and 2 involves ordinarily a lesser volume of liquid than the amount of cool propene feed introduced into reactors 4 and 5, because of the lesser degree of reaction in reactors 1 and 2. Furthermore, the introduction of benzene into reactors 1 and 2 assists in promoting the reaction of propene therein with benzene and does not introduce into the reaction zone any reactant which does not either pass into the reaction product or which is not recovered completely and recycled to the reaction zone. In this method of operation effective temperature control of the reaction zone is coupled with efficient use of the catalyst mass and substantially complete clean-up of the reactants in the fresh feed.

Since the reaction carried out in this process is one of condensation it is promoted by the application of superatmospheric pressure to the reaction zone. This has the further advantage of permitting the treatment of a larger quantity of reactants than would be accommodated in the same apparatus at relatively low pressures. Ordinarily pressures in excess of 500 pounds per square inch are preferred.

The granular catalyst mass which is preferred for use in this process comprises as an essential ingredient a pyrophosphate of copper, mercury or cobalt. Preferably the catalyst is prepared by incorporating a suitable pyrophosphate, such as copper pyrophosphate, with a carbonaceous supporting material. Preferably the catalytic material is prepared in the form of granules, each comprising an intimate mixture of copper pyrophosphate and finely divided charcoal, the latter providing the structural rigidity necessary to retain the shape of the granule in spite of any chemical change occurring during the catalytic conversion process. Such mixtures of charcoal and copper pyrophosphate are formed advantageously by maintaining a suspension of finely divided charcoal in a solution of a copper salt, such as copper sulphate, and mixing the suspension with a solution of sodium pyrophosphate. The quantities of copper sulpate and sodium pyrophosphate in the final solution are regulated to avoid any excess of the sodium pyrophosphate over the amount necessary to react with all the copper sulphate present. Preferably a slight excess of the copper sulphate is employed.

Finely divided wood charcoal capable of passing through a 200 mesh sieve is preferred for the supporting material and the quantities of copper pyrophosphate and wood charcoal are regulated to produce a finished material consisting of approximately one-third by weight of the charcoal and two-thirds by weight of the copper pyrophosphate. The precipitated mixture, after separation of the supernated liquid, is formed into granules advantageously by extruding the mixture in the form of rods which are thereafter broken into suitable lengths to form granules of the desired size. Prior to use the granules are dried to effect substantially complete removal of water.

The granules thus prepared may be used as such as the catalyst mass but preferably they are mixed uniformly with granular charcoal, the latter serving as spacer material in the contact mass.

We claim:

1. A process for alkylating unsaturated carbocyclic compounds with olefin hydrocarbons which comprises passing a heated mixture of unsaturated carbocyclic compounds and olefin hydrocarbons through a catalytic reaction zone comprising at least one elongated stationary bed of solid alkylating catalyst, introducing a cool liquefied hydrocarbon mixture comprising said olefin hydrocarbons into that portion of the reaction zone first traversed by the heated reaction mixture, and introducing cool liquefied unsaturated carbocyclic compounds into that portion of the reaction zone last traversed by the heated reaction mixture, whereby the temperature in said portions of the reaction zone is maintained at the desired operating level.

2. A process for alkylating unsaturated carbocyclic compounds with olefin hydrocarbons which comprises passing a heated mixture of unsaturated carbocyclic compounds and olefin hydrocarbons through a catalytic reaction zone comprising a series of at least two elongated stationary beds of solid alkylating catalyst, introducing into the catalyst bed first traversed by the heated reaction mixture at intervals along the length thereof cool liquefied hydrocarbons comprising said olefin hydrocarbons to maintain the temperature in said bed at the desired operating level, and introducing into the catalyst bed last traversed by the heated reaction mixture at intervals along the length thereof cool liquefied unsaturated carbocyclic compounds to maintain the temperature in said last-mentioned catalyst bed at the desired operating level.

3. A process for alkylating benzene with propene which comprises passing a heated hydrocarbon mixture comprising benzene and propene through a catalytic reaction zone comprising at least one elongated stationary bed of solid alkylating catalyst, introducing cool liquefied gas comprising propene into that portion of the reaction zone first traversed by the heated reaction mixture, and introducing cool liquefied benzene into that portion of the reaction zone last traversed by the heated reaction mixture, whereby the temperature in the reaction zone is maintained at the desired operating level.

MYRLE M. PERKINS.
BERNARDUS SELLMEYER.